A. Kinkead,
Cage Trap.
Nº 43,030.    Patented June 7, 1864.
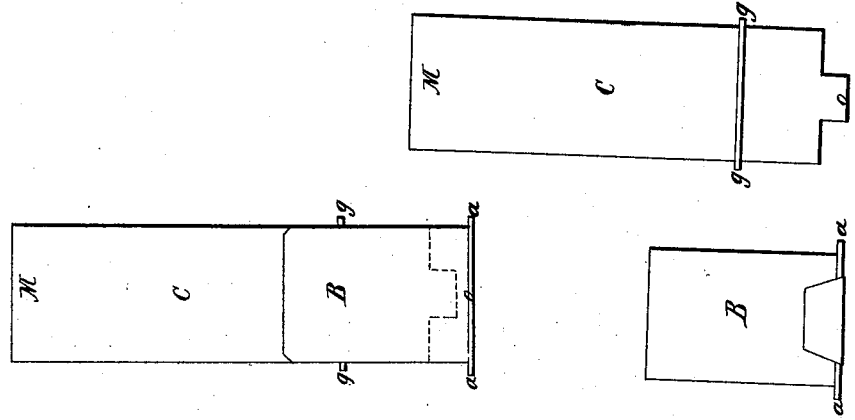
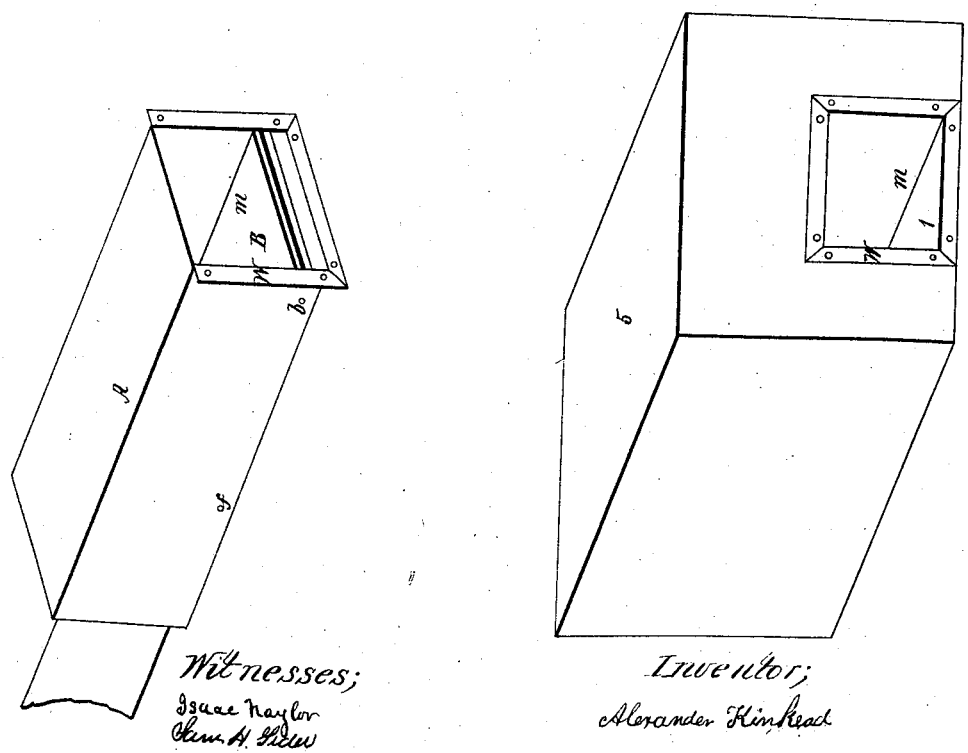
Witnesses;
Isaac Naylor
Sam. H. Sider
Inventor;
Alexander Kinkead

UNITED STATES PATENT OFFICE.

ALEXANDER KINKEAD, OF WATERTOWN, OHIO.

IMPROVEMENT IN ANIMAL-TRAPS.

Specification forming part of Letters Patent No. 43,030, dated June 7, 1864.

*To all whom it may concern:*

Be it known that I, ALEXANDER KINKEAD, of Watertown, in the county of Washington and State of Ohio, have invented a new and Improved Mode of Constructing Self-Setting Animal-Traps; and I do hereby declare that the following is a full and exact description thereof, reference being had to the accompanying drawings, and to the letters of reference marked thereon.

The nature of my invention consists in so constructing a trap that it will be all the time set or open and ready for the animal to pass in, but utterly impossible to get out.

To enable others skilled in the art to make and use my invention, I will proceed to describe its construction and operation.

I construct the box or body of the trap of sheet-metal or other material, as shown at letter A. In the inside of this box or body I place a shutter, as shown at B, at one end of which is attached a wire or pin projecting at the sides, as at $a\ a$. These projecting ends pass through the sides of the body of the box, as shown at $b$. There is a treadle, as shown at C, to which is attached a cross-piece, the ends projecting, as at $g\ g$, which pass through the sides of the box at $f$. This treadle is placed in the box, the short end being underneath the shutter B. The end of the treadle is turned under a little, as at O; and a cross-piece or fulcrum, $g\ g$, is placed on the treadle C, so when it tilts its end O will strike on the underneath side of shutter B, just back of cross-piece $a\ a$, shutter B being sufficiently long to reach over or lie on cross-piece $g\ g$ of the treadle.

W is a flange on the end of the trap.

$m$ is the entrance to the trap. When the trap is completed, as shown and described, an opening is to be made in a box and the trap placed in it, as shown at Figure 1, Fig. 5 being the box in which the trap is placed. The animal will enter at $m$ and pass through the trap into the box where the bait will be placed. On its return the animal will have to step on the treadle at M, when the front end of the treadle will instantly throw up the shutter B and effectually shut up the passage before the animal, and as soon as the animal is off of the treadle the shutter B will drop to its place again, leaving the passage open, so that those outside may pass in all the time, but out never.

These traps may be made any size from a mouse to a wolf or other animal.

I am aware that attempts have been made to construct a trap to remain open only when the thing caught attempted to go out, but they are complicated and not durable.

What I claim as my invention, and desire to secure by Letters Patent of the United States, is—

The combination and arrangement of the shutter B with the treadle-lever C, as shown and described, for the purposes set forth.

ALEXANDER KINKEAD.

In presence of—
 L. BRIGHAM,
 STEPHEN NEWTON.